(12) United States Patent
Adoline et al.

(10) Patent No.: US 9,188,184 B2
(45) Date of Patent: Nov. 17, 2015

(54) TELESCOPING STRUT

(75) Inventors: Jack W. Adoline, Holland, OH (US); Phil McConnell, Swanton, OH (US)

(73) Assignee: Barnes Group Inc., Bristol, CT (US)

( * ) Notice: Subject to any disclaimer, the term of this patent is extended or adjusted under 35 U.S.C. 154(b) by 386 days.

(21) Appl. No.: 13/470,798

(22) Filed: May 14, 2012

(65) Prior Publication Data

US 2013/0300044 A1 Nov. 14, 2013

(51) Int. Cl.
*B60G 11/14* (2006.01)
*F16F 1/04* (2006.01)
*F16F 1/12* (2006.01)
*F16F 3/00* (2006.01)

(52) U.S. Cl.
CPC .................. *F16F 1/125* (2013.01); *F16F 1/046* (2013.01); *F16F 3/00* (2013.01)

(58) Field of Classification Search
CPC ............. F16F 1/046; F16F 1/12; F16F 1/122; F16F 1/125; F16F 3/00; B60G 11/00
USPC ......... 267/249, 250, 252, 286, 289, 290, 168, 267/179; 280/124.1
See application file for complete search history.

(56) References Cited

U.S. PATENT DOCUMENTS

| | | | | |
|---|---|---|---|---|
| 571,972 | A | * | 11/1896 | Janney ........................... 267/290 |
| RE18,885 | E | * | 7/1933 | Dubonnet ........................ 267/34 |
| 2,193,567 | A | * | 3/1940 | Pointer ........................ 280/681 |
| 2,204,725 | A | * | 6/1940 | Crites ............................. 74/581 |
| 3,211,468 | A | * | 10/1965 | Flowers ................. 280/124.165 |
| 3,578,279 | A | | 5/1971 | Scheldorf |
| 3,752,461 | A | | 8/1973 | Gratzmuller |
| 3,797,817 | A | * | 3/1974 | Deisenroth ..................... 267/71 |
| 4,457,196 | A | * | 7/1984 | Cady .............................. 83/140 |
| 4,653,736 | A | | 3/1987 | Pontoppidan |
| 4,962,834 | A | | 10/1990 | Miner |
| 5,332,071 | A | | 7/1994 | Duncan |
| 5,788,262 | A | | 8/1998 | Dazy et al. |
| 5,887,857 | A | | 3/1999 | Perrin |

(Continued)

FOREIGN PATENT DOCUMENTS

| | | |
|---|---|---|
| DE | 10244379 | 4/2004 |
| GB | 2103756 | 2/1983 |

(Continued)

OTHER PUBLICATIONS

New Zealand Patent Office, Further Examination Report for corresponding New Zealand Application No. 610634, dated Jul. 30, 2013.

*Primary Examiner* — Melody Burch
(74) *Attorney, Agent, or Firm* — Fay Sharpe LLP (57) ABSTRACT

A spring system that has first and second housings and a first mechanical spring connected to the first and second housings. The first and second housings each have a front portion having a front end and rear portion having a rear end and an internal chamber. The front end of the second housing is telescopically inserted into the internal chamber of the first housing. The first mechanical spring is at least partially positioned in the internal chamber of the first and second housings. The first end of the first mechanical spring is connected to a first connection arrangement in the first housing. The second end of the first mechanical spring is connected to a second connection arrangement in the second housing. The first and/or second connection arrangement threadedly engages the first mechanical spring.

19 Claims, 5 Drawing Sheets

(56) References Cited

U.S. PATENT DOCUMENTS

| | | |
|---|---|---|
| 6,004,113 A | 12/1999 | Vay |
| 6,179,099 B1 | 1/2001 | Koch et al. |
| 6,446,946 B1 * | 9/2002 | Pelham .................. 267/137 |
| 6,942,204 B2 | 9/2005 | Wolf et al. |
| 2002/0113397 A1 | 8/2002 | Svensson et al. |
| 2004/0222579 A1 | 11/2004 | Adoline et al. |
| 2005/0029719 A1 * | 2/2005 | Adoline et al. ............ 267/70 |
| 2006/0027955 A1 | 2/2006 | Adoline et al. |

FOREIGN PATENT DOCUMENTS

| | | |
|---|---|---|
| JP | 1958-91944 | 11/1981 |
| JP | 2006-33967 | 7/1992 |
| JP | 2006-109052 | 9/1992 |

* cited by examiner

TELESCOPING STRUT

The present invention relates to spring systems, and more particularly to a spring system that includes two housing members that move relative to one another and a mechanical spring that is connected to both housing members. The spring system embodying the present invention is useful in motor vehicles for easing the opening of closure members such as luggage compartment lids, engine compartment lids, hatchbacks, doors, etc; however, the spring systems can be used in many other applications (e.g., struts, shock absorbers, garage door assemblies, hatch or lid assemblies, etc.).

BACKGROUND OF THE INVENTION

Spring systems are used in various applications, for example, to assist in lifting, opening, and damping applications. Typical applications include lifting a lid hinged to a stationary base. Other applications include lifting and/or balancing the hood of a car or trunk or the hatchback of an automobile, shock absorbers for vehicles and machinery, struts for vehicles, etc. Another application of the spring system includes damping the closing of a door hinged to a stationary frame. Many of the struts used are pneumatic or gas springs to assist the opening motion. Many of these types of spring systems contain either gas or hydraulic fluid to control forces and piston speeds. Two types of prior art gas springs are disclosed in U.S. Pat. Nos. 5,887,857 and 6,179,099, both of which are incorporated herein by reference.

Other types of spring systems include one or more mechanical springs. The spring systems can include damper systems that include mechanical springs or either gas or hydraulic fluid. Examples of such spring systems are disclosed in U.S. Pat. No. 6,942,204; United States Patent Publication Nos. 2004/0222579; 2006/0027955; and DE 10244379, all of which are incorporated herein by reference.

SUMMARY OF THE INVENTION

In accordance with one non-limiting aspect of the present invention, the spring system includes a first and second housing and one or more springs connected to or interconnected to the first and second housings. The spring system typically builds potential force as the springs are compressed and release force when the springs are expanded. In one non-limiting embodiment of the invention, the spring system includes two housings. The shape of each of the housing is non-limiting. In one non-limiting arrangement, one or both housings are tubular shaped; however, this is not required. The two housings can have a similar shape and/or length; however, this is not required. The second housing is designed to be fully or partially telescopically inserted into the first housing. The first housing can include a cavity that has a cross-sectional shape and size that is constant along a majority, at least 75%, at least 90% or 100% the longitudinal length of the cavity; however, this is not required. In one non-limiting arrangement, the cross-sectional shape of the cavity is circular, oval, triangular, square, or rectangular; however, it will be appreciated that the cavity can have other cross-sectional shapes (e.g., hexagonal, etc.). The second housing can include a cavity that has a cross-sectional shape and size that is constant along a majority, at least 75%, at least 90% or 100% the longitudinal length of the cavity; however, this is not required. In one non-limiting arrangement, the cross-sectional shape of the cavity is circular, oval, triangular, square, or rectangular; however, it will be appreciated that the cavity can have other cross-sectional shapes (e.g., hexagonal, etc.). The first and second housings can be formed of the same material; however, this is not required. The first and second housings can have the same wall thickness; however, this is not required. The first and/or second housing can include an engagement mechanism that inhibits or prevents full separation of the two housings from one another; however, this is not required. As can be appreciated, many different arrangements can be used to inhibit or prevent full separation of the two housings from one another.

In accordance with another and/or alternative non-limiting aspect of the present invention, a first mechanical spring is connected to both the first and second housings. The first and second housings each include a front and rear end. The front end of each of the housings includes an opening that forms a front entrance to each cavity in the two housings. The opening in the front end of the first housing telescopically receives the second housing. The rear end of each of the housings includes a spring connection arrangement. The spring connection arrangement is typically located in the cavity of each of the housings, however, this is not required. In one non-limiting embodiment of the invention, at least one of the spring connection arrangements includes a threaded end that is designed to enable one end of the spring to be threaded onto the spring connection arrangement. When the spring connection arrangement includes a threaded end, generally the thread has a length of over 360°, typically over 540°, and more typically over 720°. A thread having a length of 360°, requires the spring to be rotated about the threaded end 360° before the end of the spring is fully threaded onto the threaded end of the spring connection arrangement. The diameter of the threaded end is generally the same as or greater than the diameter of the inner cavity of the spring. In another and/or alternative non-limiting embodiment of the invention, both of the spring connection arrangements include a threaded end that is designed to enable one end of the spring to be threaded onto the spring connection arrangement. In still another and/or alternative non-limiting embodiment of the invention, a bushing is located in the rear end of at least one of the housings, and one end of the bushing includes the spring connection arrangement that has a threaded end. The bushing can be formed of any type of material (e.g., metal, plastic, wood, composite material, ceramic, etc.). In yet another and/or alternative non-limiting embodiment of the invention, a bushing is located in the rear end of both housings, and one end of both bushings includes the spring connection arrangement that has a threaded end.

In accordance with still another and/or alternative non-limiting aspect of the present invention, a first and second mechanical spring is included in the spring system. The first spring is connected to both the first and second housings. The second spring may or may not be connected to one or both housings. In one non-limiting embodiment, the second spring is not connected to either the first or second housing. In another non-limiting embodiment, one end of the second spring is connected to either the first or second housing and the other end of the second spring is not connected to either housing. In still another non-limiting embodiment, one end of the second spring is connected to the first housing and the other end of the second spring is connected to the second housing. The spring system can include more than two springs; however, this is not required. Such additional mechanical springs may or may not be connected at one or both ends to the first and/or second housings. In yet another non-limiting embodiment, neither end of the second spring is connected to the first and second housing. In another non-limiting embodiment, only one end of the second spring is connected to the first or second housing. In still another non-limiting embodiment, both ends of the second spring are connected to the first and second housing. In yet another non-limiting embodiment, the first end of the first and second springs is connected to a threaded bushing on the first housing. In another non-limiting embodiment, the first end of the first and second springs are connected to a threaded bushing on the first housing and the second end of the first and second springs are connected to a threaded bushing on the second housing. In still another non-limiting embodiment, the first end of the first and second spring are connected to a threaded bushing on the first housing, the second end of the first spring is connected to a threaded bushing on the second housing, and the second end of the second spring is not connected to the threaded bushing on the second housing. As can be appreciated, other materials can be used to form one or more springs such as, but not limited to, other metals, plastic materials and/or composite materials. As can be appreciated, the particular thickness of the wire used for each of the springs, the particular material used for the springs, the inner and outer diameter of each of the springs, the number of windings of each spring, the number of springs used in the spring system, the length of each of the springs, the manner in which the springs are oriented with respect to one another, the spring rate of each of the springs, and other factors will be in part dependent on the function and end use of the spring system. The particular type of spring and the physical properties of the springs are selected in a spring system to produce a load versus deflection curve that matches a particular application for the spring system.

In accordance with yet another and/or alternative non-limiting aspect of the present invention, the spring system can include more than two springs. In another and/or alternative aspect of this embodiment, the spring system includes three springs. In still another and/or alternative aspect of this embodiment, the spring system includes four springs. In yet another and/or alternative aspect of this embodiment, the spring system includes five springs. One or more of the springs can be designed so that 1) neither end of the spring is connected to the first and second housing, 2) only one end of the spring is connected to the first or second housing, or 3) both ends of the spring are connected to the first and second housings.

In accordance with another and/or alternative non-limiting aspect of the present invention, one or more of the springs in the spring system are partially or fully compressed when the spring system is in the fully compressed position.

In accordance with still another and/or alternative non-limiting aspect of the present invention, one or more of the springs in the spring system are in a non-compressed state when the spring system is in the fully compressed position.

In accordance with yet another and/or alternative non-limiting aspect of the present invention, one or more of the springs in the spring system are in an expanded state when the spring system is in the fully expanded position.

In accordance with another and/or alternative non-limiting aspect of the present invention, one or more of the springs in the spring system are in a non-expanded state when the spring system is in the fully expanded position.

In accordance with still another and/or alternative non-limiting aspect of the present invention, one or more of the springs in the spring system are in an expanded state when the spring system is in a state wherein no expansion or compression force (natural spring state) is applied to either the first or second housing.

In accordance with yet another and/or alternative non-limiting aspect of the present invention, one or more of the springs in the spring system are in a compressed state when the spring system is in a state wherein no expansion or compression force (natural spring state) is applied to either the first or second housing.

In accordance with another and/or alternative embodiment of the invention, the compression and/or expansion of two of more springs in the spring system occurs at different points during the compression or expansion of the spring system to produce a non-linear load versus deflection curve during the compression and/or expansion of the spring system.

In accordance with still another and/or alternative embodiment of the invention, the compression and/or expansion of two or more springs in the spring system occurs at the same points during the compression or expansion of the spring system to produce a linear load versus deflection curve during the compression and/or expansion of the spring system.

In accordance with yet another and/or alternative embodiment of the invention, a plurality of the springs in the spring system have a different load versus deflection curve.

In accordance with another and/or alternative embodiment of the invention, a plurality of the springs in the spring system have a similar load versus deflection curve.

In accordance with still another and/or alternative embodiment of the invention, a plurality of the springs in the spring system have different lengths.

In accordance with yet another and/or alternative embodiment of invention, a plurality of the springs in the spring system have a different spring rate.

In accordance with another and/or alternative embodiment of the invention, a plurality of the springs in the spring system have a similar spring rate.

In accordance with another and/or alternative embodiment of the invention, a plurality of the springs in the spring system in the spring system are formed from differing wire thickness and/or different materials.

In accordance with still another and/or alternative embodiment of the invention, a plurality of the springs in the spring system are formed from a similar wire thickness and/or similar materials.

In accordance with another and/or alternative aspect of the present invention, the spring system includes a plurality of springs wherein a plurality of the springs are wound in differing directions with respect to another spring. The differing direction of winding of a plurality of the springs facilitates in packaging the multiple springs in the spring system. The differing direction of winding of a plurality of the springs also facilitates in allowing for proper compression and/or expansion of the two or more springs in the spring system.

In accordance with still another and/or alternative aspect of the present invention, the spring system includes at least one spring guide to reduce the incidence of spring buckling during the operation of the spring system. Spring buckling typically occurs when the springs are being compressed. The spring guide is designed to inhibit or prevent such buckling during the operation of the spring system. The spring guide can also or alternatively be designed to control and/or limit the movement of the springs to thereby inhibit or prevent the springs becoming tangled within the spring system, thus resulting in the impairment of the operation of the spring system. The spring guide can also or alternatively be designed to control and/or limit the movement of the springs, reduce or prevent reorientation of two or more springs with respect to one another which reorientation adversely affects the operation of the spring system. In one embodiment of the invention, at least one spring guide is designed to at least partially extend into the interior of one or more springs along the longitudinal axis of the spring. For instance, a spring in the form of a coil has an inner void region that is substantially cylindrically shaped. The spring guide for such a spring is shaped and sized to be partially or fully inserted into this void inner region. In one non-limiting design, the spring guide has a maximum cross-sectional length that is less than the diameter of the substantially cylindrically shaped void inner region of the spring. In another and/or alternative non-limiting design, the spring guide has a substantially circular cross-sectional shape. As can be appreciated, the shape of the spring guide can have other shapes. The spring guide can be designed to fully or partially extend the full longitudinal length of the spring. In another and/or alternative embodiment of the invention, at least one spring guide is positioned in a substantially fixed positioned at an interior end of the first and/or second housing of the spring system.

In accordance with still another and/or alternative aspect of the present invention, the first and/or second housings have an internal chamber that is designed to encase the one or more springs of the spring system. Typically the shape of the internal chamber of the first and/or second housings is similar in shape to one or more springs; however, this is not required. The cross-sectional shape and size of the internal chamber of the first and/or second housing is selected to enable the one or more springs to be compressed and uncompressed during the operation of the spring system. The cross-sectional shape and size of the internal chamber of the first and/or second housing can also be selected so as to inhibit or prevent buckling of one or more springs during compression or decompression of the one or more springs. In one non-limiting design, the first and/or second housing has a generally cylindrically shaped internal chamber. In another and/or alternative embodiment of the invention, the exterior shape of the first and/or second housing is selected for a particular application and/or look. In one non-limiting design, the exterior shape of the first and/or second housing is generally cylindrical. In still another and/or alternative embodiment of the invention, the first and/or second housing is made of a resilient material. The material of the first and/or second housing must be durable enough to maintain the one or more springs in the internal chamber of the first and/or second housing during multiple compressions and decompressions of the one or more springs. The exterior portion of the first and/or second housing must also be durable enough to withstand the operating environment of the spring system. Typically the first and/or second housing is made of a metal material and/or a plastic material; however, other materials can be used. As can be appreciated, the external surface of the first and/or second housing can include a protective coating (e.g., polymer coating, paint, etc.) to inhibit or prevent corrosion, scratches and/or other types of damage to the first and/or second housing. In still another and/or alternative embodiment of the invention, the first and/or second housing includes an end connector connected to one end of the first and/or second housing. The end connector is designed to connect one end of the first and/or second housing to a structure that incorporates the use of the spring system. In one aspect of this embodiment, the end connector is interchangeable with another type of end connector to enable the end of the first and/or second housing to be connected to a variety of structures in a variety of ways. In yet another and/or alternative embodiment of the invention, the first and/or second housing includes one or more closure connectors that are used to facilitate in maintaining the internal components of the spring system within the internal chamber of the first and/or second housing. The one or more closure connectors can be designed to be removable to allow for maintenance and/or repair of one or more components in the internal chamber of the spring system. In such a design, the one or more closure connectors can include, but are not limited to, set screws, clamps, etc. Alternatively, the one or more closure connectors can be designed to be irremovable. In such a design, the one or more closure connectors can include, but are not limited to, rivets, welds, indents, etc.

In accordance with still another and/or alternative aspect of the present invention, the spring system includes a fluid control system within the internal chamber of the first and/or second housing that is designed to at least partially control the rate movement of the first and second housings between an extended and nonextended position and/or an nonextended to extended position. In this aspect of the present invention, the flow of a fluid in the internal chamber of the first and/or second housing is controlled to in part control the speed of uncompression of the one or more springs during extension of the spring system. The fluid can be a gas and/or a liquid. In one non-limiting design, the fluid is a gas (e.g., nitrogen, air, inert gas, etc.). Typically the selected fluid does not adversely affect the internal components of the spring system. In one embodiment of the invention, the internal chamber of the housing is divided into at least two sub-chambers by at least one movable component of the spring system. The movable component is designed to at least partially regulate the flow of fluid between at least two of the sub-chambers. This regulation of fluid flow at least partially controls the speed of expansion and/or compression of the spring system. In one non-limiting aspect of this embodiment, the movable component includes a valve system that at least partially regulates the flow of fluid between two ends of the movable component. In another and/or alternative embodiment of the invention, the housing of the spring system includes one or more seals to control the fluid flow into and/or out of the internal chamber of the first and/or second housing. In one aspect of this embodiment, the first and/or second housing includes a sealing system to inhibit or prevent fluid from flowing into and/or out of the internal chamber of the first and/or second housings. In another and/or alternative aspect of this embodiment, the first and/or second housing includes one or more openings to allow fluid to enter and/or exit the internal chamber of the first and/or second housings.

In accordance with yet another and/or alternative aspect of the present invention, the fluid control system within the internal chamber of the housing regulates fluid between at least two sub-chambers and substantially prevents fluid from flowing into or out of the internal chamber of the first and/or second housing. One or more seals such as, but not limited to, sealing rings can be used to seal the end of the first and/or second housing. The movable component includes a valve system to at least partially regulate the flow of fluid between at least two sub-chambers as the movable component moves within the internal chamber of the first and/or second housing. In one embodiment, the movable component includes a seal about the outer perimeter of the movable component to inhibit or prevent fluid from flowing about the outer perimeter of the movable component as the movable component moves within the internal chamber of the first and/or second housing. In another and/or alternative embodiment, the movable component includes one or more openings about the outer perimeter of the movable component to allow fluid to flow about the outer perimeter of the movable component as the movable component moves within the internal chamber of the first and/or second housing. In still another and/or alternative embodiment, the movable component includes one or more openings spaced from the peripheral edge of the movable component to allow fluid to flow through the movable component as the movable component moves within the internal chamber of the first and/or second housing. In one aspect of this embodiment, the movable component includes at least two openings spaced from the peripheral edge of the movable component. In one non-limiting design, one opening allows for a greater fluid flow rate through the opening than one other opening. In another and/or alternative non-limiting design, at least two openings allow for substantially the same fluid flow rate through the two openings. In another and/or alternative aspect of this embodiment, at least one of the openings includes a one way valve to allow fluid to flow in one direction and to inhibit or prevent fluid to flow in an opposite direction.

In accordance with another and/or alternative aspect of the present invention, the first and second housing include a connection arrangement that inhibits or prevents separation of the housing from one another. Many different arrangements can be used to for the connection arrangement. In one non-limiting arrangement, the first housing includes a tapered portion and the second housing includes a flange portion. In such an arrangement the tapered portion is sized and shaped to inhibit or prevent the flange portion from fully passing through the tapered portion.

In accordance with still another and/or alternative aspect of the present invention, the first and second housing can include a sealing arrangement to inhibit or prevent fluid from entering or exiting the chambers of the housing during the extension and/or expansion of the spring system. The invention relates to a telescopic strut.

In accordance with yet another and/or alternative aspect of the present invention, the spring system includes two interlocking housings wherein one of the housings is longitudinally guided inside the chamber or cavity of the other housing. The spring system includes a first helical compression spring that is at least partially positioned in the chamber or cavity of the two housings. The first compression spring is also connected or interconnected to each of the two housings. The spring system can optionally include more than one helical compression spring; however, this is not required. The spring system can optionally include a fluid damper system; however, this is not required. One or both ends of the first compression spring are threadedly connected to a spring connector that forms part of one or both housings or is part of a bushing that is connected to one or both housings.

It is accordingly an outstanding object of the present invention to provide an improved spring system for exerting an operating force on a displaceable member at a controlled rate.

Another and/or alternative object of the present invention is the provision of a spring system that supplies a consistent force over an extended period of time and maintains strength over a greater number of cycles compared to spring systems heretofore available.

Still another and/or alternative object of the present invention is the provision of a spring system having at least one mechanical spring.

Yet another and/or alternative object of the present invention is the provision of a spring system having at least two mechanical springs.

Another and/or alternative object of the present invention is to provide a mechanical spring system that can accommodate, selectively, multiple end configurations, thus adapting the assembly for mounting in a wide variety of use applications.

Still another and/or alternative object of the present invention is to provide a mechanical spring system that includes a fluid damping system.

Yet another and/or alternative object of the present invention is to provide a mechanical spring system that includes two interlocking housings wherein one of the housings is longitudinally guided inside the chamber or cavity of the other housing, a first helical compression spring is at least partially positioned in the chamber or cavity of the two housings, and the first compression spring is connected or interconnected to each of the two housings.

Still yet another and/or alternative object of the present invention is to provide a mechanical spring system that includes two interlocking housings wherein one of the housings is longitudinally guided inside the chamber or cavity of the other housing, a first helical compression spring is at least partially positioned in the chamber or cavity of the two housings, the first compression spring is connected or interconnected to each of the two housings by a threaded connection.

These and other objects and advantages will become apparent from the following description taken together with the accompanying drawing.

BRIEF DESCRIPTION OF DRAWINGS

Reference may now be made to the drawings, which illustrate various embodiments that the invention may take in physical form and in certain parts and arrangements of parts wherein.

DETAILED DESCRIPTION OF EMBODIMENTS OF THE INVENTION

Referring now in greater detail to the drawings, wherein the showings are for the purpose of illustrating various embodiments of the invention only, and not for the purpose of limiting the invention, a spring system 10, in accordance with the invention, as shown in FIGS. 1-7 is set forth. The use of the spring system of the present invention is non-limiting. The type of materials, color, and size of the spring system of the present invention is non-limiting.

Referring now to FIGS. 1-4, one non-limiting embodiment of the spring system of the present invention is illustrated. As can be appreciated, the non-limiting embodiments of the spring system illustrated in FIGS. 5 and 6 can be used in the general non-limiting configuration of the spring system illustrated in FIG. 1.

Figure 2:
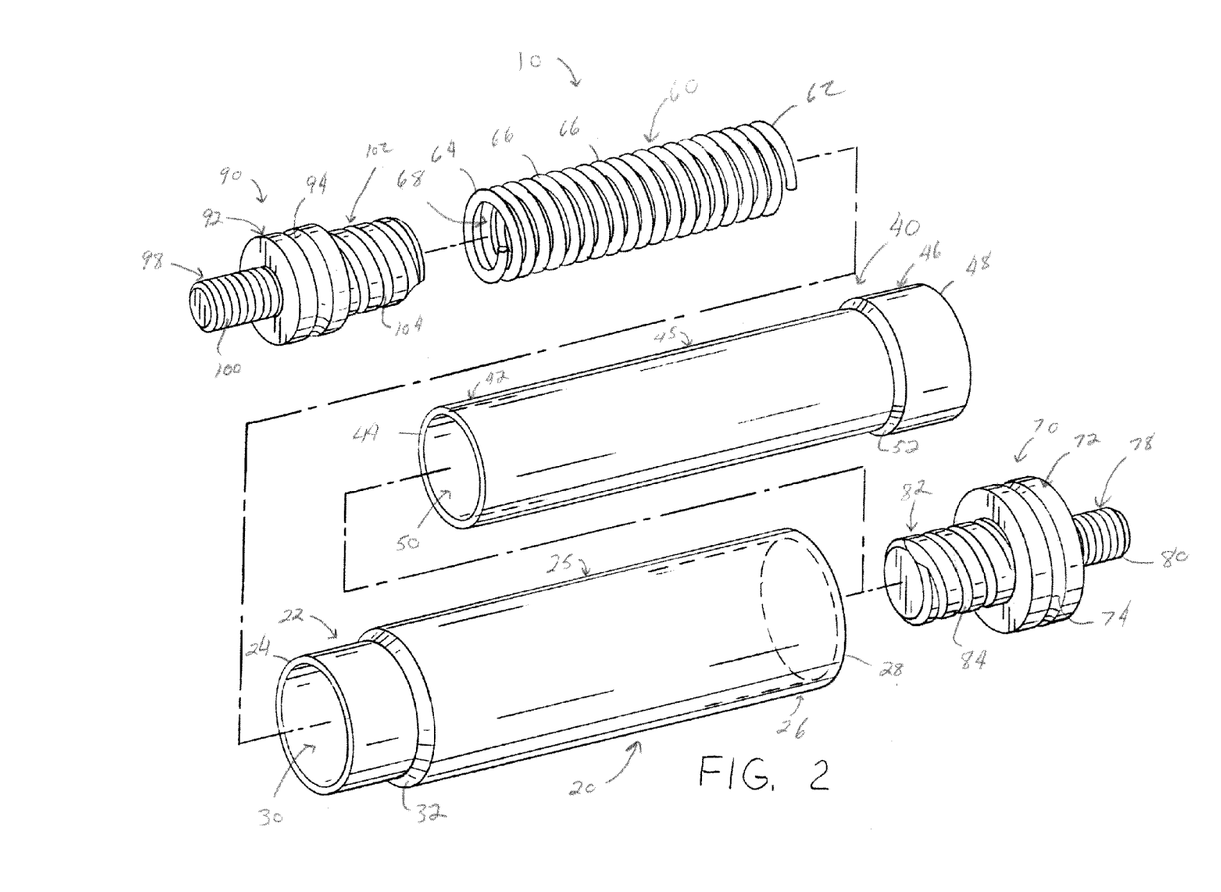
FIG. 2 is an exploded view of a perspective view of the spring system of FIG. 1.

As best illustrated in FIG. 2, spring system 10 includes a first housing 20 and a second housing 40. The first housing includes a front portion 22 having a front end 24 and rear portion 26 having a rear end 28. The first housing also includes an internal cavity or chamber 30 that extends between the front end and rear end. The cross-sectional shape of internal chamber 30 is typically circular along a majority or all of the longitudinal length of the internal chamber; however, this is not required. As can be appreciated, the cross-sectional shape of the internal chamber can have other shapes (e.g., oval, polygonal, etc.). The cross-sectional area of the internal chamber is illustrated as varying along the longitudinal length of the internal chamber; however, this is not required. As illustrated in FIG. 2, the cross-sectional area of the internal chamber at the front portion of the first housing has a smaller cross-sectional area than the remaining portion of the internal chamber. A tapered region 32 creates a transition region between the central portion 25 of the first housing and the front portion of the first housing. This tapered region results in the reduction of the cross-sectional area of the internal chamber at the front portion of the first housing. The amount of taper is non-limiting. As can be appreciated, this tapered region is optional. The cross-sectional area of the internal chamber of the central portion and the rear portion of the first housing is illustrated as being generally constant; however, this is not required. Generally, the central portion and the rear portion of the first housing constitutes over a majority, typically at least 60%, more typically at least 70%, and still more typically 75%-99% of the longitudinal length of the first housing.

The second housing 40 includes a front portion 42 having a front end 44 and rear portion 46 having a rear end 48. The second housing also includes an internal cavity or chamber 50 that extends between the front end and rear end. The cross-sectional shape of internal chamber 50 is typically circular along a majority or all of the longitudinal length of the internal chamber; however, this is not required. As can be appreciated, the cross-sectional shape of the internal chamber can have other shapes (e.g., oval, polygonal, etc.). The cross-sectional area of the internal chamber is illustrated as varying along the longitudinal length of the internal chamber; however, this is not required. As illustrated in FIG. 2, the cross-sectional area of the internal chamber at the front portion 42 and central portion 45 of the second housing has a smaller cross-sectional area than the rear portion 46 of the internal chamber. A tapered region 52 creates a transition region between the central portion 45 of the second housing and the rear portion 46 of the second housing. This tapered region results in the reduction of the cross-sectional area of the internal chamber from the rear portion to the central portion of the first housing. The amount of taper is non-limiting. As can be appreciated, this tapered region is optional. The cross-sectional area of the internal chamber of the central portion and the front portion of the second housing is illustrated as being generally constant; however, this is not required. Generally, the central portion and the front portion of the second housing constitutes over a majority, typically at least 60%, more typically at least 70%, and still more typically 75%-99% of the longitudinal length of the second housing.

Figure 1:
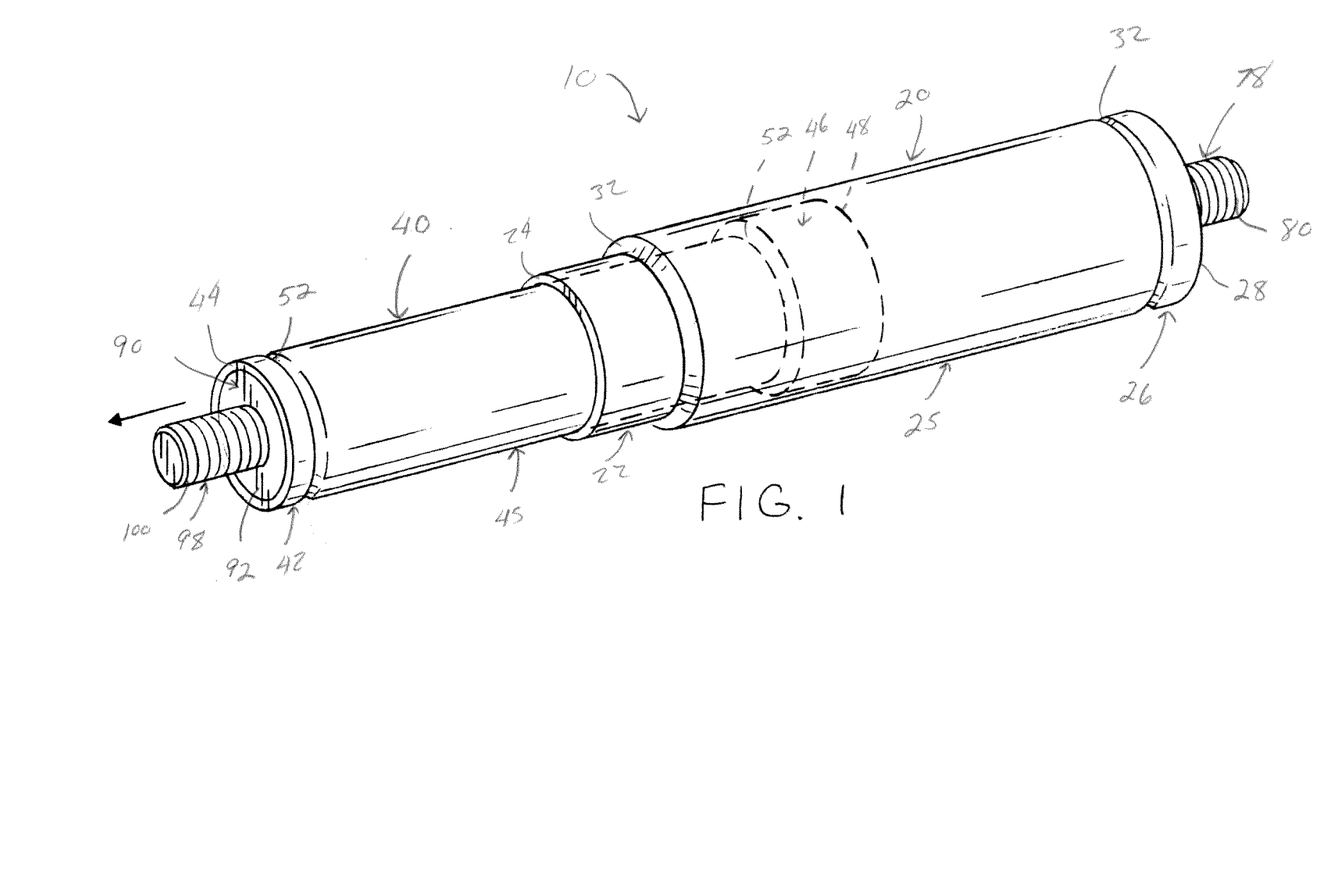
FIG. 1 is a perspective view of one non-limiting spring system in accordance with the present invention in the partially extended position.

The second housing is designed to be telescopically inserted into the internal chamber of the first housing as illustrated in FIG. 1. During assembly of the spring system, the front end 44 of the second housing is inserted into the internal chamber 30 of the first housing from the rear end 28 of the first housing; however, this is not required. The outer cross-sectional area of the front portion, central portion and rear portion of the second housing is selected to be less than or equal to the cross-sectional area of the internal chamber 30 at the central portion and rear portion of the first housing so that the complete second housing can be inserted into internal chamber 30 at rear end 28 and also be able to move in the internal chamber at the central portion and rear portion of the first housing. The shape of the outer surface of the second housing is also selected to facilitate in the insertion and movement of the second housing in the internal chamber of the first housing. Generally, the cross-sectional shape of the outer surface of the second housing is circular along the majority or all of the longitudinal length of the second housing; however, it can be appreciated that the cross-sectional shape of the outer surface of the second housing can have other shapes (e.g., oval, polygonal, etc.). The cross-section area and/or outer shape of the rear portion of the second housing is generally selected to inhibit or prevent the rear portion of the second housing from fully passing through the internal chamber 30 located at the front portion of the first housing. Such an arrangement limits the movement of the second housing in the internal chamber of the first housing and also inhibits or prevents the second housing from disengaging from the first housing when the second housing is moved forward of the front end of the first housing as illustrated by the arrow in FIG. 1. As illustrated in FIG. 2, the outer cross-sectional area of the front portion, central portion and rear portion of the second housing is less than or equal to the cross-sectional area of the internal chamber 30 at the central portion and rear portion of the first housing. The outer cross-sectional area of the rear portion of the second housing is greater than the cross-sectional area of the internal chamber 30 at the front portion of the first housing so that the rear portion of the second housing cannot pass through internal chamber 30 at the front portion of the first housing. Generally, when the second housing is moved forwardly of the front end of the first housing, the outer surface of tapered region 52 of the second housing eventually engages the inner surface of tapered region 32 of the first housing thereby inhibiting or preventing further forward movement of the second housing relative to the first housing.

Figure 5:
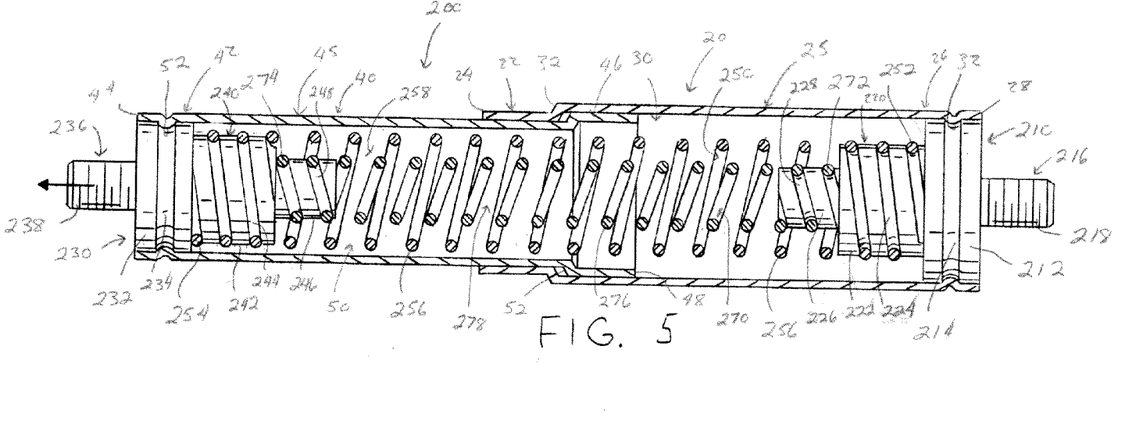
FIG. 5 is a longitudinal cross-sectional view of another non-limiting embodiment of the spring system in accordance with the present invention in an expanded or extended position.
Figure 6:
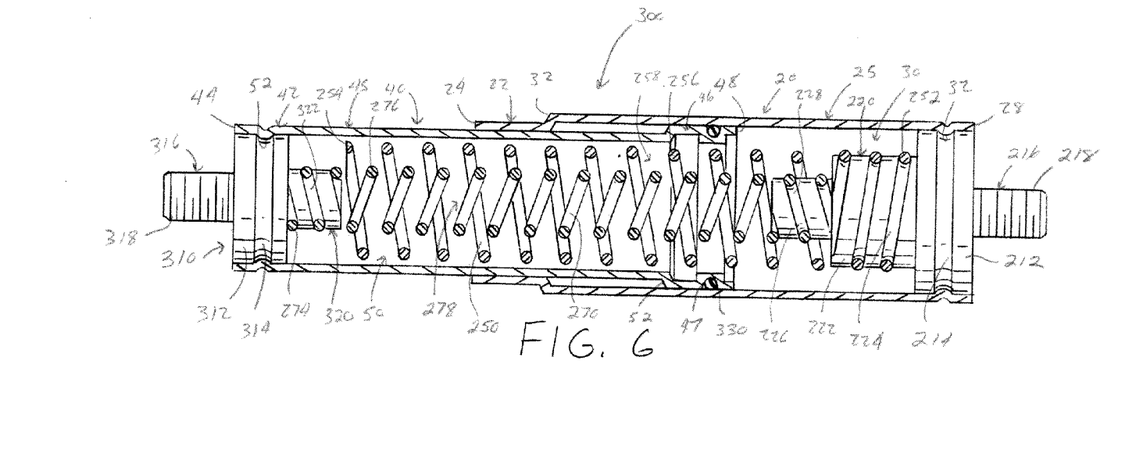
FIG. 6 is a longitudinal cross-sectional view of still another non-limiting embodiment of the spring system in accordance with the present invention in a compressed or retracted position; and, FIG. 7 illustrates two non-limiting mechanical springs wherein one or both of the springs can be used in the spring system of the present invention.

The spring system includes a mechanical spring 60. The size, shape and material of the mechanical springs are non-limiting. Generally the mechanical spring is a helical spring; however, this is not required. The spring system can include more than one mechanical spring as illustrated in FIGS. 5 and 6; however, this is not required. The mechanical spring includes a first end 62, a second end 64, a plurality of coils 66 between the first and second ends, and an inner void region 68 along a portion or all of the longitudinal length of the mechanical spring. Generally the cross-sectional shape of the inner void region is circular; however, this is not required. The cross-sectional area of the inner void region can be constant or vary along the longitudinal length of the mechanical spring. As illustrated in FIG. 2, the inner void region of the mechanical spring extends along all of the longitudinal length of the mechanical spring, has a circular cross-sectional shape along all of the longitudinal length of the mechanical spring, and the cross-sectional area of the inner void region is constant along all of the longitudinal length of the mechanical spring. The thickness of the wire or other material used to form the mechanical spring is illustrated as being constant along all of the longitudinal length of the mechanical spring; however, this is not required.

Figure 3:
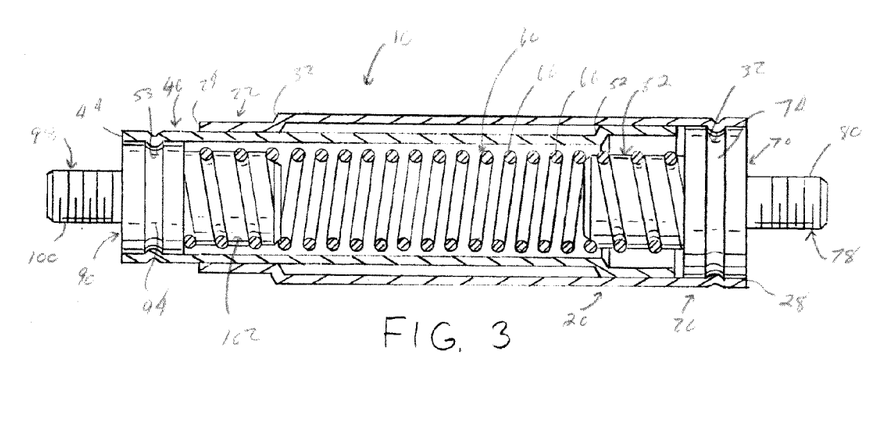
FIG. 3 is a longitudinal cross-sectional view of the spring system in accordance with the present invention in a compressed or retracted position.
Figure 4:
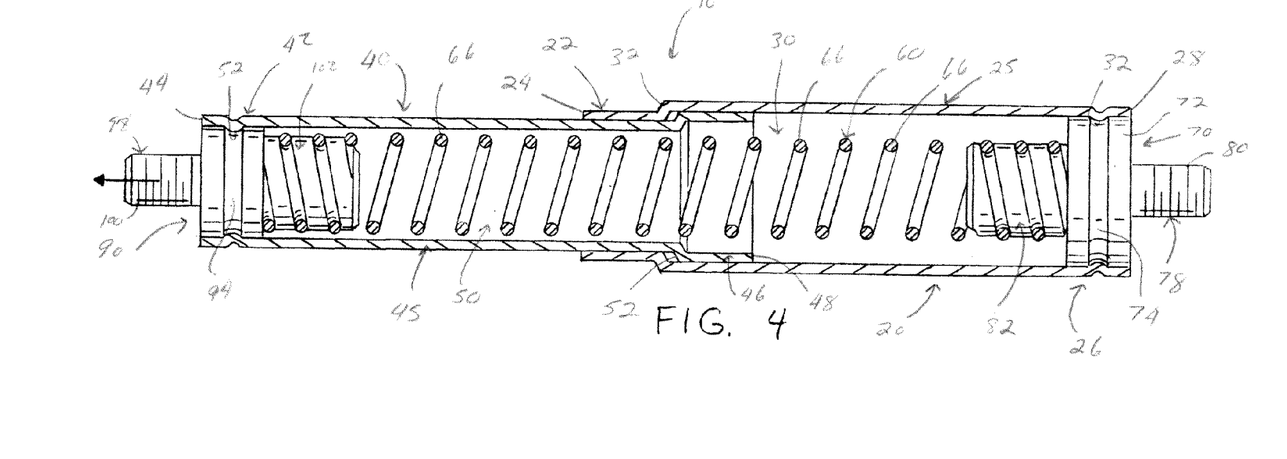
FIG. 4 is a longitudinal cross-sectional view of the spring system in accordance with the present invention in an expanded or extended position.

The spring system includes a first bushing 70 and a second bushing 90. The first bushing is designed to be connected to the rear portion of the first housing and the second bushing is designed to be connected to the front portion of the second housing as illustrated in FIGS. 3 and 4. The material, color, shape and size of the first and second bushing are non-limiting.

The first bushing is designed to form a connection arrangement with the first end 62 of the mechanical spring. The first bushing includes a body 72, a first end region 78 and a second end region 82. The outer cross-sectional shape and size of body 72 is selected to enable the body to be inserted partially or fully into internal chamber 30 at the rear portion of the first housing as illustrated in FIGS. 3 and 4. As illustrated in FIG. 2, the outer cross-sectional shape of body 72 is circular; however, this is not required. Typically the outer cross-sectional shape of body 72 has the same or similar cross-sectional shape of internal chamber 30 at the rear portion of the first housing; however, this is not required. Body 72 can optionally include a connection groove 74 that is designed to engage a connection rib 32 that is located on the inner surface of internal chamber 30 at the rear portion of the first housing as illustrated in FIGS. 3 and 4; however, this is not required. As can be appreciated, the arrangement can be reversed wherein body 72 can include a connection rib and the inner surface of internal chamber 30 at the rear portion of the first housing includes a connection groove. As can also be appreciated, other or additional connection arrangements for the bushing to the first housing can be used (e.g., adhesive, solder, weld bead, melted connection, clamp, rivet, bolt, screw, etc.). The connection rib 32 can optionally be formed by a crimping machine after the first bushing is positioned in internal chamber 30; however, it can be appreciated that connection rib 32 can be partially or fully preformed prior to insertion of the first bushing in internal chamber 30. First end region 78 of the first bushing generally includes a connector that is used to facilitate in connecting one end of the spring system to a device that includes the spring system. As illustrated in FIGS. 1-4, first end region 78 includes a threaded portion 80; however, it can be appreciated that other types of configurations for the first end region 78 can be used. The second end region 82 is designed to engage the first end region of mechanical spring 60. All or a portion of the second end region 82 includes a threaded portion 84. The second end region 82 has a shape and a size that is designed to partially or fully fit within inner void region 68 of the mechanical spring at the first end portion of the mechanical spring. As illustrated in FIG. 2, the cross-sectional shape of the second end region is generally circular; however, this is not required. The end portion of the second end region can be tapered to facilitate in the insertion of the second end region into the inner void region 68 of the mechanical spring; however, this is not required. The cross-sectional area of the second end region can vary or be constant along the longitudinal length of the second end region. As illustrated in FIGS. 2-4, the cross-sectional area of the second end region is generally constant along the longitudinal length of the second end region. The threaded portion 84 is designed to thread onto the inner surface of one or more coils 66 of the mechanical spring as illustrated in FIGS. 3 and 4. Generally at least one full coil 360 (i.e., spring rotated about the threaded portion at 360°) is threaded onto second end region 82 (i.e., spring rotated about the threaded portion at 360°). As illustrated in FIGS. 3 and 4, a plurality of coils are threaded onto second end region 82, and in particular at least three coils are threaded onto second end region 82 (i.e., spring rotated about the threaded portion at least 1080°). As illustrated in FIGS. 3 and 4, the mechanical spring is threaded onto second end region 82 until the first end 62 of the mechanical spring engages the rear face of body 70 of the first bushing; however, this is not required. As can be appreciated, other or additional connection arrangements can be used on bushing 70 to secure the first end region of the mechanical spring to first bushing 70.

The second bushing 90 is designed to form a connection arrangement with the second end 64 of the mechanical spring. The second bushing can be shaped similarly to the first bushing; however, this is not required. The second bushing includes a body 92, a first end region 98 and a second end region 102. The outer cross-sectional shape and size of body 92 is selected to enable the body to be inserted partially or fully into internal chamber 50 at the front portion of the second housing as illustrated in FIGS. 3 and 4. As illustrated in FIG. 2, the outer cross-sectional shape of body 92 is circular; however, this is not required. Typically the outer cross-sectional shape of body 92 has the same or similar cross-sectional shape of internal chamber 50 at the front portion of the first housing; however, this is not required. Body 92 can optionally include a connection groove 94 that is designed to engage a connection rib 52 that is located on the inner surface of internal chamber 50 at the front portion of the second housing as illustrated in FIGS. 3 and 4; however, this is not required. As can be appreciated, the arrangement can be reversed wherein body 92 can include a connection rib and the inner surface of internal chamber 50 at the front portion of the second housing includes a connection groove. As can also be appreciated, other or additional connection arrangements for the second bushing to the second housing can be used (e.g., adhesive, solder, weld bead, melted connection, clamp, rivet, bolt, screw, etc.). The connection rib 52 can optionally be formed by a crimping machine after the second bushing is positioned in internal chamber 50; however, it can be appreciated that connection rib 52 can be partially or fully preformed prior to insertion of the second bushing in internal chamber 50. First end region 98 of the second bushing generally includes a connector that is used to facilitate in connecting one end of the spring system to a device that includes the spring system. As illustrated in FIGS. 1-4, first end region 98 includes a threaded portion 100; however, it can be appreciated that other types of configurations for the first end region 98 can be used. The second end region 102 is designed to engage the second end region of mechanical spring 60. All or a portion of the second end region 102 includes a threaded portion 104. The second end region 102 has a shape and a size that is designed to partially or fully fit within inner void region 68 of the mechanical spring at the second end portion of the mechanical spring. As illustrated in FIG. 2, the cross-sectional shape of the second end region is generally circular; however, this is not required. The end portion of the second end region can be tapered to facilitate in the insertion of the second end region into the inner void region 68 of the mechanical spring; however, this is not required. The cross-sectional area of the second end region can vary or be constant along the longitudinal length of the second end region. As illustrated in FIGS. 2-4, the cross-sectional area of the second end region is generally constant along the longitudinal length of the second end region. The threaded portion 104 is designed to thread onto the inner surface of one or more coils 66 of the mechanical spring as illustrated in FIGS. 3 and 4. Generally at least one full coil 66 (i.e., spring rotated about the threaded portion at 360°) is threaded onto second end region 82 (i.e., spring rotated about the threaded portion at 360°). As illustrated in FIGS. 3 and 4, a plurality of coils are threaded onto second end region 102, and in particular at least three coils are threaded onto second end region 102 (i.e., spring rotated about the threaded portion at least 1080°). The number of coils of the mechanical spring that are threaded onto the first and second bushings can be the same or different. As illustrated in FIGS. 3 and 4, the number of coils of the mechanical spring that are threaded onto the first and second bushings is generally the same. As illustrated in FIGS. 3 and 4, the mechanical spring is threaded onto second end region 102 until the second end 64 of the mechanical spring engages the rear face of body 90 of the second bushing; however, this is not required. As can be appreciated, other or additional connection arrangements can be used on bushing 90 to secure the second end region of the mechanical spring to second bushing 90. The central axis of second end region, body and first end region of the first and second bushings are generally the same; however, this is not required.

The bushings of the spring system also facilitate in the assembly of the spring system. Initially, the second housing is inserted into the first housing, the mechanical spring is inserted into the internal chamber of the second housing, the first bushing is positioned in internal chamber of the rear portion of the first housing and the second bushing is positioned in the internal chamber of the front portion of the second housing. Thereafter, the two bushings are rotated to cause the end portions of the mechanical spring to be threaded onto the second end region of the two bushings. As can be appreciated, the first mechanical springs can optionally be connected to one bushing prior to be connected to the other bushing, or the mechanical spring can be connected to the two bushings at the same time. Thereafter, the two bushings are secured to the respective housing. As can be appreciated, one or both bushings can be integrally formed with the respective housing, thus be irremovable from or being formed as a single unit with the respective housing; however, this is not required.

As illustrated in FIGS. 3 and 4, the spring system is illustrated in a contracted or non-expanded state (FIG. 3) and an expanded or extended state (FIG. 4). In one non-limiting arrangement, the spring system can be configured such that when no force is applied to either end of the spring system, the spring system in its natural state is in a fully or substantially fully contracted or non-expanded state as illustrated in FIG. 3. As can be appreciated, the spring system can be configured such that when no force is applied to either end of the spring system, the spring system in its natural state is in a fully or substantially fully expanded or extended state as illustrated in FIG. 4 or at some intermediate position as illustrated in FIG. 1. Referring again to FIG. 3, when the spring system is configured such that when no force is applied to either end of the spring system, the spring system is in a fully or substantially fully contracted or non-expanded state, the spring system can be move to its fully expanded or extended state or at some point in-between by applying a pulling force on one or both ends of the spring system. As illustrated in FIG. 4, a pulling force as indicated by the arrow is applied to first end region 98 of the second bushing to cause the second housing to be drawn through the first end 24 of the first housing.

Figure 7:
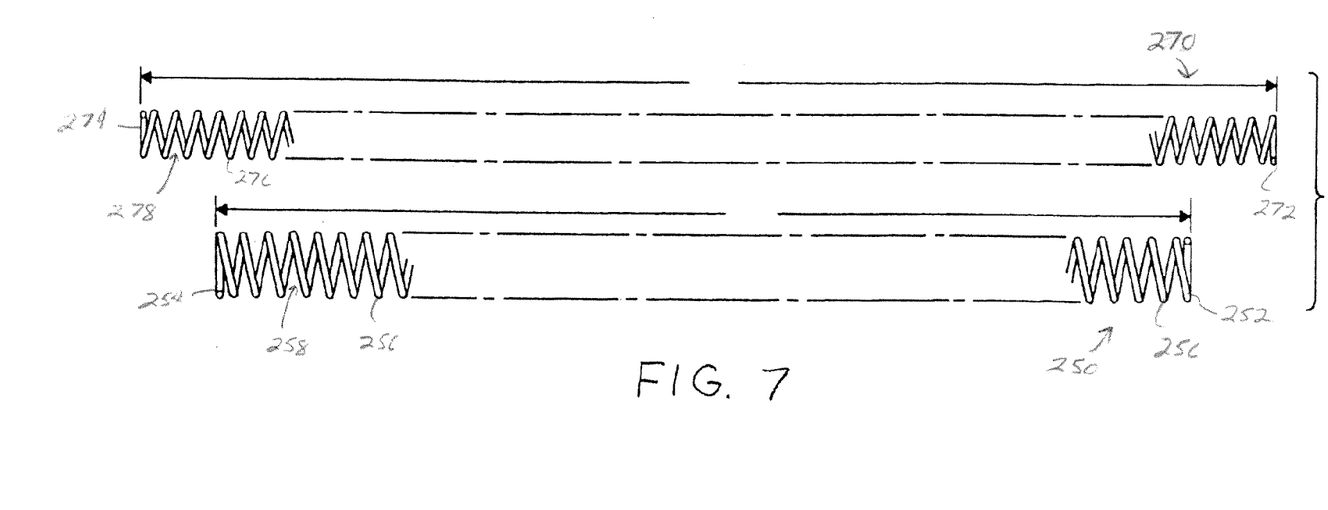

Referring now to FIGS. 5-6, two additional non-limiting embodiments of the spring system are illustrated. The first and second housings of the two springs systems illustrated in FIGS. 5-6 are substantially the same as the first and second housings illustrated in FIGS. 1-4, thus the reference numbers are maintained and the function and operation of the first and second housings will be not repeated herein. The spring systems of illustrated in FIGS. 5 and 6 include two mechanical springs. As can be appreciated, more than two mechanical springs can be used. Non-limiting examples of two mechanical springs that can be used in the spring systems illustrated in FIGS. 5 and 6 are illustrated in FIG. 7.

Referring now to FIG. 5, spring system 200 includes a first housing 20, a second housing 40, a first bushing 210, a second hushing 230, a first mechanical spring 250 and a second mechanical spring 270.

The size, shape and material of the first and second mechanical springs 250, 270 are non-limiting. Generally the first and second mechanical springs are helical springs; however, this is not required. The first mechanical spring 250 includes a first end 252, a second end 254, a plurality of coils 256 between the first and second ends, and an inner void region 258 along a portion or all of the longitudinal length of the first mechanical spring. Generally the cross-sectional shape of the inner void region is circular; however, this is not required. The cross-sectional area of the inner void region can be constant or vary along the longitudinal length of the mechanical spring. As illustrated in FIG. 5, the inner void region of the mechanical spring extends along all of the longitudinal length of the mechanical spring, has a circular cross-sectional shape along all of the longitudinal length of the mechanical spring, and the cross-sectional area of the inner void region is constant along all of the longitudinal length of the mechanical spring. The thickness of the wire or other material used to form the mechanical spring is illustrated as being constant along all of the longitudinal length of the mechanical spring; however, this is not required.

The second mechanical spring 270 includes a first end 272, a second end 274, a plurality of coils 276 between the first and second ends, and an inner void region 278 along a portion or all of the longitudinal length of the first mechanical spring. Generally the cross-sectional shape of the inner void region is circular; however, this is not required. The cross-sectional area of the inner void region can be constant or vary along the longitudinal length of the mechanical spring. As illustrated in FIG. 5, the inner void region of the mechanical spring extends along all of the longitudinal length of the mechanical spring, has a circular cross-sectional shape along all of the longitudinal length of the mechanical spring, and the cross-sectional area of the inner void region is constant along all of the longitudinal length of the mechanical spring. The thickness of the wire or other material used to form the mechanical spring is illustrated as being constant along all of the longitudinal length of the mechanical spring; however, this is not required. As illustrated in FIG. 5, the thickness of the first and second mechanical springs is generally the same; however, this is not required. The free length of the first mechanical spring is generally the same length or longer than the second mechanical spring; however, this is not required. As illustrated in FIG. 7, the wire thickness of the first mechanical spring 270 is greater than the wire thickness of the second mechanical spring 290. Also as illustrated in FIG. 7, the free length (i.e., the length of a spring when no force is applied to either end of the spring) of the first mechanical spring is less than the free length of the second mechanical spring. As can be appreciated, the first and/or second mechanical springs illustrated in FIG. 7 can be substituted for one or both the mechanical springs illustrated in FIG. 5.

As illustrated in FIG. 5, the outer diameter of the second mechanical spring 270 is less than or equal to the diameter of the inner void region 258 of the first mechanical spring 250 so that the second mechanical spring can be partially or fully inserted into the inner void region 258 of the first mechanical spring. The direction of windings of the first and second mechanical springs is illustrated as being in the same direction; however, this is not required. As illustrated in FIG. 7, the outer diameter of the second mechanical spring 270 is also less than or equal to the diameter of the inner void region 258 of the first mechanical spring 250 so that the second mechanical spring can be partially or fully inserted into the inner void region 258 of the first mechanical spring.

The first bushing 210 is designed to form a connection arrangement with the first end region of the first and second mechanical springs 250, 270. The first bushing includes a body 212, a first end region 216 and a second end region 220. The outer cross-sectional shape and size of body 212 is selected to enable the body to be inserted partially or fully into internal chamber 30 at the rear portion of the first housing as illustrated in FIG. 5. The outer cross-sectional shape of body 212 is generally circular; however, this is not required. Typically the outer cross-sectional shape of body 212 has the same or similar cross-sectional shape of internal chamber 30 at the rear portion of the first housing; however, this is not required. Body 212 can optionally include a connection groove 214 that is designed to engage a connection rib 32 that is located on the inner surface of internal chamber 30 at the rear portion of the first housing as illustrated in FIG. 5; however, this is not required. As can be appreciated, the arrangement can be reversed wherein body 212 can include a connection rib and the inner surface of internal chamber 30 at the rear portion of the first housing includes a connection groove. As can also be appreciated, other or additional connection arrangements for the bushing to the first housing can be used (e.g., adhesive, solder, weld bead, melted connection, clamp, rivet, bolt, screw, etc.). The connection rib 32 can optionally be formed by a crimping machine after the first bushing is positioned in internal chamber 30; however, it can be appreciated that connection rib 32 can be partially or fully preformed prior to insertion of the first bushing in internal chamber 30. First end region 216 of the first bushing 210 generally includes a connector that is used to facilitate in connecting one end of the spring system to a device that includes the spring system. As illustrated in FIG. 5, first end region 216 includes a threaded portion 218; however, it can be appreciated that other types of configurations for the first end region 216 can be used. The second end region 220 includes a first portion 222 and a second portion 226. The first portion 222 of the second end region 220 is designed to engage the first end region of first mechanical spring 250. All or a portion of first portion 222 of the second end region 220 includes a threaded portion 224. The first portion 222 of the second end region 220 has a shape and a size that is designed to partially or fully fit within inner void region 258 of the first mechanical spring 250 at the first end portion of the first mechanical spring. As illustrated in FIG. 5, the cross-sectional shape of the first portion 222 of the second end region 220 is generally circular; however, this is not required. The end portion of the first portion 222 of the second end region 220 can be tapered to facilitate in the insertion of the first portion 222 of the second end region 220 into the inner void region 258 of the first mechanical spring; however, this is not required. The cross-sectional area of the first portion 222 of the second end region 220 can vary or be constant along the longitudinal length of the first portion 222 of the second end region 220. As illustrated in FIG. 5, the cross-sectional area of the first portion 222 of the second end region 220 is generally constant along the longitudinal length of the first portion 222 of the second end region 220. The threaded portion 224 is designed to thread onto the inner surface of one or more coils 256 of the first mechanical spring 250 as illustrated in FIG. 5. Generally at least one full coil 256 (i.e., spring rotated about the threaded portion at 360°) is threaded onto first portion 222 of the second end region 220 (i.e., spring rotated about the threaded portion at 360°). As illustrated in FIG. 5, a plurality of coils 256 are threaded onto first portion 222 of the second end region 220, and in particular at least three coils are threaded onto first portion 222 of the second end region 220 (i.e., spring rotated about the threaded portion at least 1080°). As illustrated in FIG. 5, the mechanical spring is threaded onto first portion 222 of the second end region 220 until the first end 252 of the first mechanical spring 250 engages the rear face of body 212 of the first bushing; however, this is not required. As can be appreciated, other or additional connection arrangements can be used on bushing 210 to secure the first end region of the first mechanical spring 250 to first bushing 210. The second portion 226 of the second end region 220 is designed to engage the first end region of second mechanical spring 270. All or a portion of second portion 226 of the second end region 220 includes a threaded portion 228. The second portion 226 of the second end region 220 has a shape and a size that is designed to partially or fully fit within inner void region 278 of the second mechanical spring 270 at the first end portion of the second mechanical spring. As illustrated in FIG. 5, the cross-sectional shape of the second portion 226 of the second end region 220 is generally circular; however, this is not required. The end portion of the second portion 226 of the second end region 220 can be tapered to facilitate in the insertion of the second portion 226 of the second end region 220 into the inner void region 278 of the second mechanical spring; however, this is not required. The cross-sectional area of the second portion 226 of the second end region 220 can vary or be constant along the longitudinal length of the second portion 226 of the second end region 220. As illustrated in FIG. 5, the cross-sectional area of the second portion 226 of the second end region 220 is generally constant along the longitudinal length of the second portion 226 of the second end region 220. The threaded portion 228 is designed to thread onto the inner surface of one or more coils 276 of the second mechanical spring 270 as illustrated in FIG. 5. Generally at least one full coil 276 (i.e., spring rotated about the threaded portion at 360°) is threaded onto second portion 226 of the second end region 220 (i.e., spring rotated about the threaded portion at 360°). As illustrated in FIG. 5, a plurality of coils 276 are threaded onto second portion 226 of the second end region 220, and in particular at least three coils are threaded onto second portion 226 of the second end region 220 (i.e., spring rotated about the threaded portion at least 1080°). As illustrated in FIG. 5, the mechanical spring is threaded onto second portion 226 of the second end region 220 until the first end 272 of the second mechanical spring 270 engages the rear face of first portion 222 of the first bushing; however, this is not required. As can be appreciated, other or additional connection arrangements can be used on bushing 210 to secure the first end region of the second mechanical spring 270 to first bushing 210. The central axis of the first portion 222 and the second portion 226 are generally the same; however, this is not required. As illustrated in FIG. 5, the central axis of first portion 222, second portion 226, body 212 and first end region 216 are generally the same. The diameter or cross-sectional area of first portion 222 is greater than the diameter or cross-sectional area of second portion 226.

The second bushing 230 is designed to form a connection arrangement with the second end region of the first and second mechanical springs 250, 270. The second bushing can be shaped similarly to the first bushing; however, this is not required. The second bushing includes a body 232, a first end region 236 and a second end region 240. The outer cross-sectional shape and size of body 232 is selected to enable the body to be inserted partially or fully into internal chamber 50 at the front portion of the second housing as illustrated in FIG. 5. The outer cross-sectional shape of body 232 is generally circular; however, this is not required. Typically the outer cross-sectional shape of body 232 has the same or similar cross-sectional shape of internal chamber 50 at the front portion of the second housing; however, this is not required. Body 232 can optionally include a connection groove 234 that is designed to engage a connection rib 52 that is located on the inner surface of internal chamber 50 at the front portion of the second housing as illustrated in FIG. 5; however, this is not required. As can be appreciated, the arrangement can be reversed wherein body 232 can include a connection rib and the inner surface of internal chamber 50 at the front portion of the second housing includes a connection groove. As can also be appreciated, other or additional connection arrangements for the second bushing to the second housing can be used (e.g., adhesive, solder, weld bead, melted connection, clamp, rivet, bolt, screw, etc.). The connection rib 52 can optionally be formed by a crimping machine after the second bushing is positioned in internal chamber 50; however, it can be appreciated that connection rib 52 can be partially or fully preformed prior to insertion of the second bushing in internal chamber 50. First end region 236 of the second bushing 230 generally includes a connector that is used to facilitate in connecting one end of the spring system to a device that includes the spring system. As illustrated in FIG. 5, first end region 236 includes a threaded portion 238; however, it can be appreciated that other types of configurations for the first end region 236 can be used. The second end region 240 includes a first portion 242 and a second portion 246. The first portion 242 of the second end region 240 is designed to engage the second end region of first mechanical spring 250. All or a portion of first portion 242 of the second end region 240 includes a threaded portion 244. The first portion 242 of the second end region 240 has a shape and a size that is designed to partially or fully fit within inner void region 258 of the first mechanical spring 250 at the second end portion of the first mechanical spring. As illustrated in FIG. 5, the cross-sectional shape of the first portion 242 of the second end region 240 is generally circular; however, this is not required. The end portion of the first portion 242 of the second end region 240 can be tapered to facilitate in the insertion of the first portion 242 of the second end region 240 into the inner void region 258 of the first mechanical spring; however, this is not required. The cross-sectional area of the first portion 242 of the second end region 240 can vary or be constant along the longitudinal length of the first portion 242 of the second end region 240. As illustrated in FIG. 5, the cross-sectional area of the first portion 242 of the second end region 240 is generally constant along the longitudinal length of the first portion 242 of the second end region 240. The threaded portion 244 is designed to thread onto the inner surface of one or more coils 256 of the first mechanical spring 250 as illustrated in FIG. 5. Generally at least one full coil 256 (i.e., spring rotated about the threaded portion at 360°) is threaded onto first portion 242 of the second end region 240 (i.e., spring rotated about the threaded portion at 360°). As illustrated in FIG. 5, a plurality of coils 256 are threaded onto first portion 242 of the second end region 240, and in particular at least three coils are threaded onto first portion 242 of the second end region 240 (i.e., spring rotated about the threaded portion at least 1080°). As illustrated in FIG. 5, the mechanical spring is threaded onto first portion 242 of the second end region 240 until the second end 254 of the first mechanical spring 250 engages the rear face of body 232 of the second bushing; however, this is not required. As can be appreciated, other or additional connection arrangements can be used on bushing 230 to secure the first end region of the first mechanical spring 250 to second bushing 230. The second portion 246 of the second end region 240 is designed to engage the second end region of second mechanical spring 270. All or portion of second portion 246 of the second end region 240 includes a threaded portion 248. The second portion 246 of the second end region 240 has a shape and a size that is designed to partially or fully fit within inner void region 278 of the second mechanical spring 270 at the second end portion of the second mechanical spring. As illustrated in FIG. 5, the cross-sectional shape of the second portion 246 of the second end region 240 is generally circular; however, this is not required. The end portion of the second portion 246 of the second end region 240 can be tapered to facilitate in the insertion of the second portion 246 of the second end region 220 into the inner void region 278 of the second mechanical spring; however, this is not required.

The cross-sectional area of the second portion 246 of the second end region 240 can vary or be constant along the longitudinal length of the second portion 246 of the second end region 240. As illustrated in FIG. 5, the cross-sectional area of the second portion 246 of the second end region 240 is generally constant along the longitudinal length of the second portion 246 of the second end region 240. The threaded portion 248 is designed to thread onto the inner surface of one or more coils 276 of the second mechanical spring 270 as illustrated in FIG. 5. Generally at least one full coil 276 (i.e., spring rotated about the threaded portion at 360°) is threaded onto second portion 246 of the second end region 240 (i.e., spring rotated about the threaded portion at 360°). As illustrated in FIG. 5, a plurality of coils 276 are threaded onto second portion 246 of the second end region 240, and in particular at least three coils are threaded onto second portion 246 of the second end region 240 (i.e., spring rotated about the threaded portion at least 1080°). As illustrated in FIG. 5, the mechanical spring is threaded onto second portion 246 of the second end region 240 until the second end 274 of the second mechanical spring 270 engages the rear face of first portion 242 of the second bushing; however, this is not required. As can be appreciated, other or additional connection arrangements can be used on bushing 230 to secure the second end region of the second mechanical spring 270 to second bushing 230. The central axis of the first portion 242 and the second portion 246 are generally the same; however, this is not required. As illustrated in FIG. 5, the central axis of first portion 242, second portion 246, body 232 and first end region 236 are generally the same. The diameter or cross-sectional area of first portion 242 is greater than the diameter or cross-sectional area of second portion 246.

The bushings of the spring system also facilitate in the assembly of the spring system. Initially, the second housing is inserted into the first housing, the first and second mechanical spring are inserted into the internal chamber of the second housing, the first bushing is positioned in the internal chamber of the rear portion of the first housing and the second bushing is positioned in the internal chamber of the front portion of the second housing. Thereafter, the two bushings are rotated to cause the end portions of the first and second mechanical spring to be threaded onto the second end region of the two bushings. Generally a portion or all of the threading of the two mechanical springs onto one or both bushings occurs at the same time; however, this is not required. As can be appreciated, the first and second mechanical springs can optionally be connected to one bushing prior to being connected to the other bushing, or the two mechanical springs can be connected to the two bushings at the same time. Thereafter, the two bushings are secured to the respective housing. As can be appreciated, one or both bushings can be integrally formed with the respective housing, thus be irremovable from or being formed as a single unit with the respective housing; however, this is not required.

As illustrated in FIG. 5, the spring system is illustrated in an expanded or extended state. A pulling force is applied to first end region 236 of the second bushing to cause the second housing to be drawn through the first end 24 of the first housing.

Referring now to FIG. 6, the spring system 300 is similar to spring system 200 except that the second bushing 310 on spring system 300 is different from second bushing 230 of spring system 200. In addition, spring system 300 includes a sealing arrangement that does not exist on spring system 200. The operation and assembly of spring system 300 is very similar to spring systems 10 and 200, thus will not be repeated herein. The reference numbers for similar components of spring system 200 and spring system 300 will remain the same.

Referring now to FIG. 6, spring system 300 includes a first housing 20, a second housing 40, a first bushing 210, a second bushing 310, a first mechanical spring 250 and a second mechanical spring 270. As illustrated in FIG. 6, first bushing 210 is configured similarly to first bushing 210 of spring system 200 illustrated in FIG. 5 and connects to first and second mechanical springs 250, 270 in a similar manner as first bushing 210 of spring system 200 illustrated in FIG. 5. Second bushing 310 is illustrated as only connecting to the second end 274 of second mechanical spring 270. The second end 254 of the first mechanical spring is not connected to second bushing 310 or any other portion of second housing 40. As can be appreciated, second bushing 310 can be designed to only connect to the second end 254 of first mechanical spring 250, and the second end 274 of the second mechanical spring is not connected to second bushing 310 or any other portion of second housing 40.

The second bushing 310 is designed to form a connection arrangement with the second end region of only the second mechanical spring 270. The second bushing can be shaped similarly to the first bushing; however, this is not required. The second bushing includes a body 312, a first end region 316 and a second end region 320. The outer cross-sectional shape and size of body 312 is selected to enable the body to be inserted partially or fully into internal chamber 50 at the front portion of the second housing as illustrated in FIG. 6. The outer cross-sectional shape of body 312 is generally circular; however, this is not required. Typically the outer cross-sectional shape of body 312 has the same or similar cross-sectional shape of internal chamber 50 at the front portion of the second housing; however, this is not required. Body 312 can optionally include a connection groove 314 that is designed to engage a connection rib 52 that is located on the inner surface of internal chamber 50 at the front portion of the second housing as illustrated in FIG. 6; however, this is not required. As can be appreciated, the arrangement can be reversed wherein body 312 can include a connection rib and the inner surface of internal chamber 50 at the front portion of the second housing includes a connection groove. As can also be appreciated, other or additional connection arrangements for the second bushing to the second housing can be used (e.g., adhesive, solder, weld bead, melted connection, clamp, rivet, bolt, screw, etc.). The connection rib 52 can optionally be formed by a crimping machine after the second bushing is positioned in internal chamber 50; however, it can be appreciated that connection rib 52 can be partially or fully preformed prior to insertion of the second bushing in internal chamber 50. First end region 316 of the second bushing 310 generally includes a connector that is used to facilitate in connecting one end of the spring system to a device that includes the spring system. As illustrated in FIG. 6, first end region 316 includes a threaded portion 318; however, it can be appreciated that other types of configurations for the first end region 316 can be used. The second end region 320 is designed to engage the second end region of second mechanical spring 270. All or a portion of second end region 320 includes a threaded portion 322. The second end region 320 has a shape and a size that is designed to partially or fully fit within inner void region 278 of the second mechanical spring 270 at the second end portion of the second mechanical spring. As illustrated in FIG. 6, the cross-sectional shape of second end region 320 is generally circular; however, this is not required. The end portion of second end region 320 can be tapered to facilitate in the insertion of second end region 240 into the inner void region 278 of the second mechanical spring; however, this is not required. The cross-sectional area of second end region 320 can vary or be constant along the longitudinal length of second end region 320. As illustrated in FIG. 6, the cross-sectional area of the second end region 320 is generally constant along the longitudinal length of second end region 320. The threaded portion 322 is designed to thread onto the inner surface of one or more coils 276 of the second mechanical spring 270 as illustrated in FIG. 6. Generally at least one full coil 276 (i.e., spring rotated about the threaded portion at 360°) is threaded onto second end region 320 (i.e., spring rotated about the threaded portion at 360°). As illustrated in FIG. 6, a plurality of coils 276 are threaded onto second end region 320, and in particular at least three coils are threaded onto second end region 320 (i.e., spring rotated about the threaded portion at least 1080°). As illustrated in FIG. 6, the mechanical spring is threaded onto second end region 320 until the second end 274 of the second mechanical spring 270 engages the rear face of body 312 of the second bushing; however, this is not required. As can be appreciated, other or additional connection arrangements can be used on bushing 310 to secure the first end region of the second mechanical spring 270 to second bushing 310. The central axis of second end region 320, body 312 and first end region 316 are generally the same; however, this is not required.

The bushings of the spring system also facilitates in the assembly of the spring system. Initially, the second housing is inserted into the first housing, the first and second mechanical spring are inserted into the internal chamber of the second housing, the first bushing is positioned in the internal chamber of the rear portion of the first housing and the second bushing is positioned in the internal chamber of the front portion of the second housing. Thereafter, the two bushings are rotated to cause the end portions of the first and second mechanical spring to be threaded onto the second end region of the first bushing and the second mechanical spring to be threaded onto the second end regions of the second bushing. Generally a portion or all of the threading of the first and second mechanical springs onto one or both of the bushings occurs at the same time; however, this is not required. As can be appreciated, the first and/or second mechanical springs can optionally be connected to one bushing prior to being connected to the other bushing, or the first and/or second mechanical springs can be connected to the first and/or second bushings at the same time. Thereafter, the two bushings are secured to the respective housing. As can be appreciated, one or both bushings can be integrally formed with the respective housing, thus be irremovable from or being formed as a single unit with the respective housing; however, this is not required.

As illustrated in FIG. 6, the spring system is illustrated in a partially expanded or extended state when no force is being applied to the spring system. A pulling force can be applied to first end region 316 of the second bushing and/or first end region 216 of the first bushing to cause the second housing to be drawn through the first end 24 of the first housing to move the spring system toward or to the fully expanded or extended position. Also, a compressing force can be applied to first end region 316 of the second bushing and/or first end region 216 of the first bushing to cause the second housing to be pushed back into the first end 24 of the first housing to move the spring system toward or to the fully compressed or contracted or non-extended position.

As illustrated in FIG. 6, the windings of the coils of the first and second mechanical springs are in the opposite direction from one another. Such a winding configuration can also be used in the spring system 200 illustrated in FIG. 5. Also, the windings of the first and second mechanical springs in spring system 300 can be in the same direction as illustrated in FIG. 5 for spring system 200.

As also illustrated in FIG. 6, the spring system can optionally include a sealing system and/or damping system. Such a sealing system and/or damping system can also optionally be used in spring systems 10 and 200 illustrated in FIGS. 1-5. In one non-limiting arrangement, the first bushing can form a fluid seal system at the rear end of the first housing and/or the second bushing can form a fluid seal system at the front end of the second housing; however, this is not required. The first and/or second bushings can be designed to create a fluid seal that does not allow fluid (e.g., gas, liquid, gas and liquid, etc.) to flow into and/or out of the internal chambers of the first and/or second housings when the spring system is moved between a fully extended or expanded position and a fully contracted or compressed or non-expanded position. Alternatively, the first and/or second bushings can be designed to create a fluid seal that controllably allows fluid to flow into and/or out of the internal chambers of the first and/or second housings when the spring system is moved between a fully extended or expanded position and a fully contracted or compressed or non-expanded position. In another and/or alternative non-limiting embodiment, the spring system can include a sealing arrangement that forms a fluid seal between the first and second housings. One non-limiting arrangement of such a sealing arrangement is illustrated in FIG. 6. As illustrated in FIG. 6, the outer surface of the rear portion 46 of the second housing 40 includes a seal ring groove 47 that is designed to receive a sealing ring 330. As can be appreciated, other arrangements can be used to mount the sealing ring to rear portion 46 of the second housing. As can be appreciated, the sealing ring can be mounted to other regions of the second housing and/or be mounted to the inner surface of the internal chamber of the first housing. As can also be appreciated, more than one sealing ring can be used. The shape, size and materials used to form the sealing ring is non-limiting. The one or more sealing rings, when used, can be designed to 1) create a fluid seal that does not allow fluid to flow into and/or out of the internal chambers of the first and/or second housings when the spring system is moved between a fully extended or expanded position and a fully contracted or compressed or non-expanded position, or 2) create a fluid seal that controllably allows fluid to flow into and/or out of the internal chambers of the first and/or second housings when the spring system is moved between a fully extended or expanded position and a fully contracted or compressed or non-expanded position.

While considerable emphasis has been placed herein on the structures and configurations of the preferred embodiments of the invention, it will be appreciated that other embodiments, as well as modifications of the embodiments disclosed herein, can be made without departing from the principles of the invention. In this respect, it will be appreciated that multiple combinations of coaxial and surrounding springs (i.e. three, four, etc.) may be configured to meet the desired load versus deflection for a particular application. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

Having thus described the invention, it is claimed:

1. A spring system comprising first and second housings and a first mechanical spring securely connected to both said first and second housings, said first and second housings each including a front portion having a front end and rear portion having a rear end and an internal chamber, said rear end of said second housing telescopically inserted into said internal chamber of said first housing at said front end of said first housing, said first and second housings being connected together to prevent separation of said first and second housings from one another, said first and second housings moveable relative to one another; said first housing having a first housing opening into said internal chamber at said front end, said first housing opening having a first cross-sectional area, said second housing having a second housing opening into said internal chamber at said rear end, said second housing opening having a second cross-sectional area, said first cross-sectional area smaller than said second cross-sectional area thereby inhibiting said rear portion of said second housing from disengaging from and fully passing through said first housing opening when said rear portion of said second housing is positioned in said internal chamber of said first housing, said first mechanical spring having a first end portion with a first end and a second end portion with a second end and a void inner region that at least partially extends between said first and second ends, said first mechanical spring is at least partially positioned in said internal chamber of said first and second housings, said first end portion of said first mechanical spring is connected to a first connection arrangement in said chamber of said first housing, said second end portion of said first mechanical spring is connected to a second connection arrangement in said chamber of said second housing, said first connection arrangement threadedly engages said first end portion of said first mechanical spring to prevent said first mechanical spring from disengaging from said first housing when said first and second housings move relative to one another, said second connection arrangement threadedly engages said second end portion of said first mechanical spring to prevent said first mechanical spring from disengaging from said second housing when said first and second housings move relative to one another, said first mechanical spring fully contained within said internal chambers of said first and second housing when said first and second housings are connected together.

2. The spring system as defined in claim 1, wherein said first connection arrangement is at least partially inserted into said void inner region at said first end portion of said first mechanical spring and to threadedly engage an inner surface of said first end portion of said first mechanical spring.

3. The spring system as defined in claim 1, wherein said second connection arrangement is at least partially inserted into said void inner region at said second end portion of said first mechanical spring and to threadedly engage an inner surface of said second end portion of said first mechanical spring.

4. The spring system as defined in claim 2, wherein said second connection arrangement is at least partially inserted into said void inner region at said second end portion of said first mechanical spring and to threadedly engage an inner surface of said second end portion of said first mechanical spring.

5. The spring system as defined in claim 1, including a second mechanical spring, said second mechanical spring at least partially positioned in said internal chamber of said first and second housings.

6. The spring system as defined in claim 4, including a second mechanical spring, said second mechanical spring at least partially positioned in said internal chamber of said first and second housings.

7. The spring system as defined in claim 5, wherein said second mechanical spring connected to said first connection arrangement, said second connection arrangement, or combinations thereof.

8. The spring system as defined in claim 6, wherein said second mechanical spring connected to said first connection arrangement, said second connection arrangement, or combinations thereof.

9. The spring system as defined in claim 8, wherein said second mechanical spring is threadedly connected to said first connection arrangement and said second connection arrangement.

10. The spring system as defined in claim 1, wherein said first connection arrangement is connected to said rear portion of said first housing, said second connection arrangement is connected to said front portion of said second housing, said first connection arrangement including a body, a first end region and a second end region, said body including a connection structure designed to secure said first connection arrangement to said rear portion of said first housing, said second end region of said first connection arrangement including a threaded portion that threadedly engages said first end portion of said first mechanical spring, said first end region including a connector to connect to another structure.

11. The spring system as defined in claim 4, wherein said first connection arrangement is connected to said rear portion of said first housing, said second connection arrangement is connected to said front portion of said second housing, said first connection arrangement including a body, a first end region and a second end region, said body including a connection structure designed to secure said first connection arrangement to said rear portion of said first housing, said second end region of said first connection arrangement including a threaded portion that threadedly engages said first end portion of said first mechanical spring, said first end region including a connector to connect to another structure.

12. The spring system as defined in claim 10, wherein said second connection arrangement including a body, a first end region and a second end region, said body including a connection structure designed to secure said second connection arrangement to said front portion of said second housing, said second end region of said second connection arrangement including a threaded portion that threadedly engages said second end portion of said first mechanical spring, said first end region including a connector to connect to another structure.

13. The spring system as defined in claim 11, wherein said second connection arrangement including a body, a first end region and a second end region, said body including a connection structure designed to secure said second connection arrangement to said front portion of said second housing, said second end region of said second connection arrangement including a threaded portion that threadedly engages said second end portion of said first mechanical spring, said first end region including a connector to connect to another structure.

14. The spring system as defined in claim 9, wherein said first connection arrangement is connected to said rear portion of said first housing, said second connection arrangement is connected to said front portion of said second housing, said first connection arrangement including a body, a first end region and a second end region, said body including a connection structure designed to secure said first connection arrangement to said rear portion of said first housing, said second end region of said first connection arrangement including first and second threaded portions, said first threaded portion threadedly engages said first end portion of said first mechanical spring, said second threaded portion threadedly engages said first end portion of said second mechanical spring, said first end region of said first connection arrangement including a connector to connect to another structure, said second connection arrangement including a body, a first end region and a second end region, said body including a connection structure designed to secure said second connection arrangement to said front portion of said second housing, said second end region of said second connection arrangement including first and second threaded portions, said first threaded portion threadedly engages said second end portion of said first mechanical spring, said second threaded portion threadedly engages said second end portion of said second mechanical spring, said first end region of said second connection arrangement including a connector to connect to another structure.

15. The spring system as defined in claim 1, including a fluid sealing arrangement between said first and second housings.

16. The spring system as defined in claim 1, wherein a cross section area of said internal chamber of said first housing varies along a longitudinal length of said first housing, said internal chamber of said first housing having a first front chamber cross-sectional area at said front portion of said first housing and a first rear chamber cross-sectional area at said rear portion of said first housing, said second housing having a second front chamber cross-sectional area at said front portion of said second housing and a second rear chamber cross-sectional area at said rear portion of said second housing, said second rear chamber cross-sectional area greater than said first front chamber cross-sectional area.

17. The spring system as defined in claim 14, wherein said second mechanical spring is at least partially positioned in said void inner region of said first mechanical spring, an outside diameter of said first mechanical spring is greater than an outside diameter of said second mechanical spring, said first mechanical spring has a different wire diameter than a wire diameter of said second mechanical spring, said first mechanical spring having a different free length than a free length of said second mechanical spring, a direction of winding of said first mechanical spring is opposite to a direction of winding of said second mechanical spring.

18. A spring system comprising first and second housings and first and second mechanical springs securely connected to both said first and second housings, said first and second housings each including a front portion having a front end and rear portion having a rear end and an internal chamber, said rear end of said second housing telescopically inserted into said internal chamber of said first housing at said front end of said first housing, said first and second housings being connected together to prevent separation of said first and second housings from one another, said first and second housings moveable relative to one another, said first housing having a first housing opening into said internal chamber at said front end, said first housing opening having a first cross-sectional area, said second housing having a second housing opening into said internal chamber at said rear end, said second housing opening having a second cross-sectional area, said first cross-sectional area smaller than said second cross-sectional area thereby inhibiting said rear portion of said second housing from disengaging from and fully passing through said first housing opening when said rear portion of said second housing is positioned in said internal chamber of said first housing, said first mechanical spring having a first end portion with a first end and a second end portion with a second end and a void inner region that at least partially extends between said first and second ends, said second mechanical spring having a first end portion with a first end and a second end portion with a second end and a void inner region that at least partially extends between said first and second ends, said first and second mechanical springs at least partially positioned in said internal chamber of said first and second housings, said first end portion of said first and second mechanical springs is connected to a first connection arrangement in said chamber of said first housing, said second portion end of said first and second mechanical springs is connected to a second connection arrangement in said chamber of said second housing, said first connection arrangement threadedly engages said first end portion of said first and second mechanical springs to prevent said first and second mechanical springs from disengaging from said first housing when said first and second housings move relative to one another, said second connection arrangement threadedly engages said second end portion of said first and second mechanical springs to prevent said first and second mechanical springs from disengaging from said second housing when said first and second housing move relative to one another, said first connection arrangement is at least partially inserted into said void inner region at said first end portion of said first and second mechanical springs and to threadedly engage an inner surface of said first end portion of said first and second mechanical springs, said second connection arrangement is at least partially inserted into said void inner region at said second end portion of said first and second mechanical springs and to threadedly engage an inner surface of said second end portion of said first and second mechanical springs, said first and second mechanical springs fully contained within said internal chambers of said first and second housing when said first and second housings are connected together.

19. The spring system as defined in claim 18, including first and second bushings, said first bushing connected to said rear portion of said first housing, said second bushing connected to said front portion of said second housing, said first and second bushings create a fluid seal that does not allow fluid to flow into and/or out of the internal chambers of the first and/or second housings when the spring system is moved between a fully extended or expanded position and a fully contracted or compressed or non-expanded position, each of said first and second bushings including a connector located in a top portion of said bushings, said top portion of each of said bushings facing outwardly from said internal chambers of said first and second housings.

* * * * *